UNITED STATES PATENT OFFICE.

LEANDER R. STREETER, OF CHELSEA, MASSACHUSETTS, ASSIGNOR TO HIMSELF AND A. B. ELY, TRUSTEES.

Letters Patent No. 88,260, dated March 23, 1869.

IMPROVED COMPOSITION FOR DENTAL PLATES.

The Schedule referred to in these Letters Patent and making part of the same.

Be it known that I, LEANDER R. STREETER, of Chelsea, in the State of Massachusetts, have discovered or invented certain new and useful Improvements in the Manufacture of Dental Plates and artificial gums for teeth, &c., of which the following is a full description.

I have for many years been thinking and experimenting upon the subject of dental base-plates, and the materials and modes of manufacturing the same, and have spent much time, and made many experiments in the use of resinous gums and filamentary-substances, and also of dissolved gun-cotton, or pyroxyle, or xyloidine, and various substances in combination therewith, for that purpose, as well as others.

After a considerable time, I prepared and filed a caveat for the use of pyroxyle in the manufacture of base-plates and artificial gums for teeth, which I renewed, and subsequently amended, and I believe myself to be the first person who ever conceived or attempted the use of pyroxyle for that purpose.

My attention to the subject has been diligent and constant. Some of the difficulties to be overcome, in arriving at success, have been very perplexing, although I early arrived at a practical demonstration of the feasibility of my invention or discovery.

My invention relates—

First, to a new and useful material or materials for the manufacture of dental plates, &c., and Second, to the method of manufacturing the same.

With regard to the first, it is necessary that the material, as well as the finished plate, should, in its perfected condition, possess strength, toughness, and durability, as well as suitable resiliency and elasticity, and, at the same time, be innocuous, and devoid of taste, or insoluble in such acids or alkalies as are common to the human system.

I am aware that some of the essential ingredients which I use have been heretofore used for various purposes other than for dental plates and gums, &c., but I am not aware that the same materials have ever before been used and combined in the manner and for the purposes which I have had in view. I therefore do not, in this patent, claim broadly the use of either of those ingredients separately, nor the use of pyroxylene generally; nor the necessary reduction of the material in compound to a hard condition, and then to a powder, and then a paste, to produce what is properly termed massive substance; but I here confine myself to the materials, compounds, and their equivalents, now about to be described, as applied to dentistry, and which seem to me both new and useful, as well as the method of applying the same in manufacturing-dentistry.

In the beginning of my experiments, I found that, when I combined gums alone with pyroxyle, suitably dissolved, and intermixed with proper materials to give the requisite color, on being compressed in the moulds, and dried, the shrinkage of the plate was usually such as to render the attachment of the teeth imperfect, requiring the aid of extraneous devices to overcome it, thus making the process both tedious and laborious. Besides, the material thus formed, when formed, became frangible, and liable to break on any sudden blow or strain, and this more especially when enough of the resinous body was used to make the material what is correctly termed massive—conditions coming short of its perfect success. Hence I found the necessity of modifying the tendency to shrinkage and frangibility by combining some less shrinkable substances with which it would harmonize, while preserving and increasing its strength, toughness, and elasticity, or of varying the proportions of the parts, or both—conditions essential to perfect success.

The materials which I found to answer best the purposes desired were waxes and oils, separately or combined; and these by themselves, or combined with gums or resins, and with these, or either of them, the preponderance of pyroxyle should be large. The use of the wax or oil gave a degree of toughness and strength to the plate which the resins alone did not impart, and, at the same time, very materially lessened its shrinkage. The other ingredients I use, in connection with those already mentioned, are for the purpose of giving body and requisite color to the plate.

The basis of my material is pyroxyle, or xyloidine, formed of cotton or other fibre, treated with nitric, or nitric and sulphuric acids, and afterward dissolved in any of the well-known solvents, or, in other words, gun-cotton, dissolved or partially dissolved in a proper solvent; and the basis of my method of manufacture is packing the material, and bringing it into proper shape in moulds by pressure, and hardening it by evaporation. The material may be in a very soft condition, but the harder it can be used the more convenient is the manipulation.

One of the main difficulties to be overcome is shrinkage, and one of the main points to be gained is nice adhesion.

The materials which may be combined with the pyroxyle are manifold; but I have found the following mode of preparation and of manipulation expeditious, simple, and assured, and the result satisfactory. It will illustrate the better mode to be pursued in all cases, although I do not confine myself to these proportions.

The process of preparing and flasking the teeth is the same as prevails in the use of vulcanized-rubber plates, except that I have found advantage in making the cast of the concave part removable.

To prepare the material, the following formula is recommended:

Pyroxyle, or xyloidine, two hundred and forty parts.
Wax, (bleached preferred,) fifty parts.
Zinc-white, or other white body, thirty parts.
Color to suit. Dissolve the pyroxyle in about two ounces of ether, or enough to make a pretty stiff pulp, with a little alcohol added. Dissolve the wax in ether separately, with the color added. Mix the two, and add the white, the whole to be perfectly incorporated. I then prefer to form the mass into a layer, or sheet, of about three-sixteenths or a quarter of an inch in thickness, and to harden it by evaporation.

In this form I can keep it any length of time, and can use more or less, as wanted, and can manipulate it more conveniently.

To form the plate, divide the hardened sheet in smaller or larger pieces, convenient for use, put them into a suitable vessel, and cover them with ether or other solvent, until the surfaces of the pieces are well softened, (and, by this time, the whole will ordinarily be sufficiently pliant;) then pour off the solvent, and commence to pack the softened material into the mould, moistening with the solvent, or with the pyroxyle solution, in the mould, as you proceed, in order that the pieces may adhere together, and the whole to the teeth.

When a sufficient quantity has been packed, bring the two moulds together, in the usual manner, gradually applying pressure, as evaporation and shrinkage follow.

I have found advantage in placing a piece or pieces of the softened sheet of material, cut to about the shape of the mould, upon the mould, bringing the flask quickly together.

In flasking, I prefer a mode invented by me, in which the concave part of the cast is made removable, so that if, after evaporation, the plate is found to have shrunk from the teeth, on raising the removable part, by adding a little, or by moistening the parts, the difficulty can be overcome; or by inserting one or more pieces of soft broadcloth or felting, or other even and flexible material, moistening the same with the solvent, and renewing the pressure, the plate will be perfectly and permanently forced into place, if the pressure is sufficient, and maintained till the solvent is perfectly evaporated.

A piece of rubber, interposed, will often be of service in forcing the material into irregular places, and upon the pins or other devices for securing the teeth to the plate. Where this is not sufficient, add another sheet, or layer, or flake of the material, more or less, as and where needed.

The evaporation of the solvent may be accomplished in from two and a half to three hours, unless the plate is a very thick one, by using heat, which I recommend should not exceed two hundred and twenty degrees. For this purpose, I prefer boiling water in which some saline body is dissolved, putting the flask in a dry vulcanizer, or other vessel, set in the water, not, however, allowing the water or steam to come in contact with the flask or forming-plate.

Another preliminary mode of preparing the pyroxyle, or material, is that of detaching portions from the pulp in flakes, or small pieces, whereby it is made to harden rapidly, and is quickly softened for packing.

Or the hardened material, disintegrated, may be intermixed with a portion of the pulp, rendered tolerably fluid, using no more than, by stirring and intermixing, will cover the surface of the whole, and allowing them to remain till sufficient plasticity results, and then pack the moulds.

Another convenient mode, is to cover the face of each mould with the material in pulp, partially evaporate, and then bring the moulds together, with the hardening-surfaces made adhesive by the solution, or some other cementing-agent.

Or the whole may be brought into a softened mass, and pressed into the moulds, and hardened.

Or a cast may be made, of the general shape of the plate to be formed, but of sufficient proportions to contain all the material required for the plate, and in this the material placed, and allowed to partially harden, or to fully harden, and be subsequently softened by a solvent, and the plate formed in the mould from this. In some respects, this is the more expeditious and reliable mode.

In some cases, the plate may be moulded into shape, and hardened, and the teeth subsequently attached, by moistening and pressure, or otherwise.

I have given various modes of manipulation. There are others that can be employed, but they all embrace the softening of the material, packing it in moulds, applying pressure, and evaporating the solvents.

In compounding with pyroxyle or xyloidine, so long as the body contains about three-fourths of pyroxyle, and the added material is finely divided by solution, or otherwise, and the combination is perfect, the strength of the plate will be ample. The proportions may vary somewhat, but the pyroxyle should predominate, and the other materials be such as will harmonize with it.

The final working and finishing of the base-plate is similar to that of vulcanized rubber.

I do not find metal moulds, nor severe pressure, nor long time, necessary for my purposes, as would be the case under some conditions of mixture and management; but I have found the ordinary plaster-moulds and casts, and a few hours' time, sufficient.

When the material is packed, or used in pieces, the surfaces must be made adhesive, when forced together, by the use of a solvent, or the material in solution, or other suitable cement.

I may add, that sheets of fibrous or textile materials may be treated with the acids, and then moistened and softened with the solvents, and used in forming dental plates, &c., as indicated.

What I claim, is—

1. The use of soluble pyroxyle, or xyloidine, or gun-cotton, prepared and combined with other substances, substantially as described, in such manner as will give the requisite toughness, durability, hardness, elasticity, and strength, for forming dental plates and artificial gums for teeth, substantially as set forth.

2. The method of preparing and manipulating the material, substantially as described, for the purposes set forth.

3. The attachment, or combination of artificial teeth to or with artificial bases, or gums, composed and prepared substantially as described.

4. Dental plates and gums for artificial teeth, &c., substantially as described, when composed of the material and made in the method substantially as set forth.

In testimony whereof, I have hereunto subscribed my name.

L. R. STREETER.

Witnesses:
  J. W. PRESTON,
  M. E. INGALLS.